United States Patent
Faibish et al.

(10) Patent No.: US 10,191,916 B1
(45) Date of Patent: Jan. 29, 2019

(54) STORAGE SYSTEM COMPRISING CLUSTER FILE SYSTEM STORAGE NODES AND SOFTWARE-DEFINED STORAGE POOL IN CLOUD INFRASTRUCTURE

(71) Applicant: EMC Corporation, Hopkinton, MA (US)

(72) Inventors: Sorin Faibish, Newton, MA (US); Dennis Ting, Groton, MA (US); Percy Tzelnic, Concord, MA (US); James M. Pedone, Jr., West Boylston, MA (US); Boyd Wilson, Clemson, SC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 293 days.

(21) Appl. No.: 15/185,236

(22) Filed: Jun. 17, 2016

(51) Int. Cl.
*G06F 17/30* (2006.01)
*H04L 29/08* (2006.01)

(52) U.S. Cl.
CPC ...... *G06F 17/302* (2013.01); *G06F 17/30235* (2013.01); *H04L 67/1097* (2013.01)

(58) Field of Classification Search
CPC ...................................... G06F 17/30
USPC ........................................ 707/831
See application file for complete search history.

(56) References Cited

U.S. PATENT DOCUMENTS

| | | | |
|---|---|---|---|
| 2013/0227194 A1 | 8/2013 | Kannan et al. | |
| 2014/0040206 A1* | 2/2014 | Ramakrishnan .... | G06F 11/2097 707/640 |
| 2014/0337576 A1* | 11/2014 | Burton ................. | G06F 3/0689 711/114 |
| 2014/0337577 A1* | 11/2014 | Burton ................. | G06F 3/0617 711/114 |
| 2015/0296169 A1* | 10/2015 | Saif ........................ | H04N 5/77 386/224 |
| 2016/0203008 A1* | 7/2016 | Cui ....................... | G06F 9/455 718/1 |

(Continued)

OTHER PUBLICATIONS

"EMC 2 Tiers Solution Prototype," http://veddiew.typepad.com/blog/2015/05/emc-two-tiers-storage-solution-prototype.html, Sep. 25, 2015, 2 pages.

(Continued)

*Primary Examiner* — Kim T Nguyen
(74) *Attorney, Agent, or Firm* — Ryan, Mason & Lewis, LLP

(57) ABSTRACT

An apparatus in one embodiment comprises a multi-tier storage system having at least a front-end storage tier and a back-end storage tier. The multi-tier storage system is implemented at least in part utilizing a plurality of virtual machines of cloud infrastructure. The front-end storage tier comprises a plurality of storage nodes of a cluster file system, with the storage nodes being implemented on respective ones of the virtual machines. The front-end storage tier further comprises a software-defined storage pool accessible to the storage nodes and implemented utilizing local disk resources of respective ones of the virtual machines. The back-end storage tier of the multi-tier storage system comprises at least one object store. At least a subset of the virtual machines may further comprise respective compute nodes configured to access the multi-tier storage system. Other illustrative embodiments include systems, methods and processor-readable storage media.

17 Claims, 4 Drawing Sheets

(56) References Cited

U.S. PATENT DOCUMENTS

2017/0235594 A1* 8/2017 Vankadaru .......... G06F 9/45558
718/1

OTHER PUBLICATIONS

EMC Corporation, "EMC Tiered Storage for SAP: a New Way to Optimize with Use Cases for EMC Symmetrix VMAX with FAST and Virtual LUN," White Paper, Applied Technology, May 2010, 14 pages.
EMC Corporation, "EMC ScaleIO," V1.32, User Guide, #302-001-033, Rev. 11, May 2015, 536 pages.
EMC Corporation, "EMC 2-TIERS-POSIX Namespace for 2nd and 3rd Platform Storage Systems," Dec. 2015, 3 pages.
J. Hilland et al., "RDMA Protocol Verbs Specification (Version 1.0)," draft-hillard-iwarp-verbs-v1.0, Apr. 2003, 243 pages.
EMC Corporation, "EMC Elastic Cloud Storage—Software-Defined Object Storage—Cloud-Scale Capabilities and Economics," EMC Data Sheet, Oct. 2015, 4 pages.
EMC Corporation, "EMC ATMOS Cloud Storage—A Platform to Store, Archive, and Access Unstructured Data at Scale—Data, Application, Access Demands," EMC Data Sheet, Sep. 2014, 3 pages.
EMC Corporation, "Technical White Paper: Elastic Cloud Storage Software Atchitecture—Deploy a Modern Hyperscale Storage Platform on Commodity Infrastructure," EMC White Paper, Feb. 2015, 12 pages.
EMC Corporation, "EMC SCALEIO Operation Overview—Ensuring Non-Disruptive Operation and Upgrade," EMC White Paper, Mar. 2015, 10 pages.
U.S. Appl. No. 14/871,160 filed in the name of S. Faibish et al. on Sep. 30, 2015 and entitled "Translation-Based Name Node Configuration for Object Access in a Multi-Tier Storage System.".
Adam Moody, "Overview of the Scalable Checkpoint / Restart (SCR) Library," S&T Principal Directorate—Computation Directorate, Oct. 14, 2009, 33 pages.
U.S. Appl. No. 14/973,245 filed in the name of Sorin Faibish et al. on Dec. 17, 2015 and entitled "Multi-Tier Storage System Having Front-End Storage Tier Implemented Utilizing Software-Defined Storage Functionality.".

* cited by examiner

STORAGE SYSTEM COMPRISING CLUSTER FILE SYSTEM STORAGE NODES AND SOFTWARE-DEFINED STORAGE POOL IN CLOUD INFRASTRUCTURE

FIELD

The field relates generally to information processing systems, and more particularly to storage in information processing systems.

BACKGROUND

Storage systems are often configured to include multiple storage tiers, with different ones of the tiers providing different levels of input-output (IO) performance or other characteristics. In such systems, data may be moved from one tier to another within a given storage system based on access frequency of the data or other factors.

These and other types of storage systems may incorporate one or more object stores. In an object store, data is exposed and managed in the form of objects instead of files or blocks. Different objects can include different amounts and types of unstructured data but each object is identified by a globally unique identifier. Objects can therefore be stored in a flat address space such as a storage pool. The unique identifier of a given object allows an application or other requesting entity to retrieve that object without needing to know the physical location in which the object is stored. Accordingly, object stores abstract away complexities associated with lower level storage functions. Object stores are commonly utilized in cloud storage environments and numerous other storage applications.

Despite the advantages associated with storage tiering and object stores, additional improvements are needed in terms of data access performance and scalability, particularly for storage implemented in information processing systems that include potentially large numbers of compute nodes.

SUMMARY

Illustrative embodiments of the present invention provide information processing systems that include multi-tier storage systems in which a front-end storage tier is implemented utilizing storage nodes of a cluster file system and a software-defined storage pool accessible to the storage nodes. The storage nodes and the software-defined storage pool of the front-end storage tier are implemented using virtual machines of cloud infrastructure. Such a multi-tier storage system arrangement can provide a significant reduction in the costs associated with deployment of storage for tenants in public clouds or other types of cloud infrastructure, while also providing an enhanced ability to recover from virtual machine failures.

In one embodiment, an apparatus comprises a multi-tier storage system having at least a front-end storage tier and a back-end storage tier. The multi-tier storage system is implemented at least in part utilizing a plurality of virtual machines of cloud infrastructure. The front-end storage tier comprises a plurality of storage nodes of a cluster file system, with the storage nodes being implemented on respective ones of the virtual machines. The front-end storage tier further comprises a software-defined storage pool accessible to the storage nodes and implemented utilizing local disk resources of respective ones of the virtual machines. The back-end storage tier of the multi-tier storage system comprises at least one object store. At least a subset of the virtual machines may further comprise respective compute nodes configured to access the multi-tier storage system.

The front-end storage tier in some embodiments more particularly comprises a fast tier of a 2 TIERS™ storage system, although other types of multi-tier storage systems can be used in other embodiments.

In addition to the above-noted advantages of reduced cost and enhanced failure recovery for cloud storage deployments, illustrative embodiments can provide significant improvements in terms of data access performance and scalability relative to conventional arrangements. For example, reduced data access latency can be provided and larger numbers of nodes supported than in conventional front-end storage tier implementations. Similar advantages are provided for other multi-tier storage system arrangements.

These and other illustrative embodiments include, without limitation, apparatus, systems, methods and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
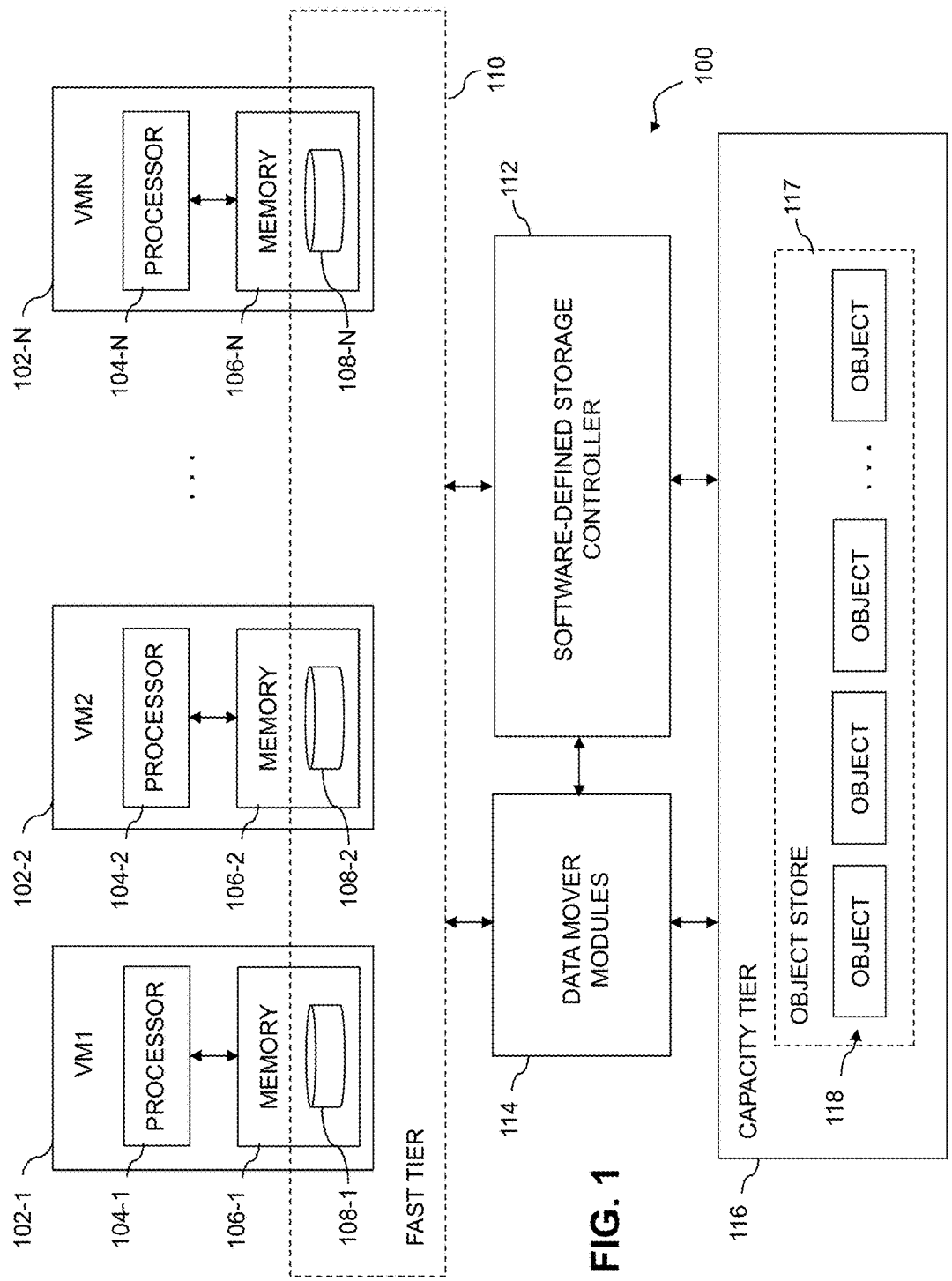
FIG. 1 is a block diagram of an information processing system comprising a multi-tier storage system in which a front-end storage tier comprises cluster file system storage nodes and a software-defined storage pool implemented using cloud infrastructure in an illustrative embodiment of the invention.

FIG. 1 shows an information processing system 100 configured in accordance with an illustrative embodiment of the present invention. The information processing system 100 comprises virtual machines 102-1, 102-2, . . . 102-N, also denoted as VM1, VM2, . . . VMN, respectively. The virtual machines 102 comprise respective processors 104-1, 104-2, . . . 104-N coupled to respective memories 106-1, 106-2, . . . 106-N. Portions 108-1, 108-2, . . . 108-N of the respective memories 106-1, 106-2, . . . 106-N collectively comprise at least part of a fast tier 110 of a multi-tier storage system. The fast tier 110 is an example of what is more generally referred to herein as a "front-end storage tier" of the multi-tier storage system. Other types of front-end storage tiers can be used in other embodiments.

The fast tier 110 in the present embodiment is more particularly configured to include a plurality of storage nodes of a cluster file system, with the storage nodes being implemented on respective ones of the virtual machines 102. For example, such storage nodes can be implemented using processor and memory components of the virtual machines 102. Accordingly, the fast tier 110 as illustrated in FIG. 1 may additionally encompass other parts of the virtual machines 102 beyond the portions 108 of the memories 106.

The term "cluster file system" as used herein is intended to be broadly construed so as to encompass a parallel file system, a distributed file system or combinations of multiple file systems of potentially different types.

The fast tier 110 is further assumed to comprise a software-defined storage pool accessible to the storage nodes and implemented utilizing local disk resources of respective ones of the virtual machines. The local disk resources illustratively comprise at least parts of the portions 108 of the memories 106.

Accordingly, in the present embodiment, the fast tier 110 is implemented on the virtual machines 102 utilizing processor and memory components of those virtual machines to provide storage nodes of a cluster file system and a software-defined storage pool accessible to those storage nodes.

A more particular example of the manner in which virtual machines are utilized to implement storage nodes and a software-defined storage pool of a fast tier of a multi-tier storage system will be described below in conjunction with FIGS. 3 and 4.

At least a subset of the virtual machines 102 may implement respective compute nodes that are configured to access the fast tier 110 of the multi-tier storage system. Accordingly, it is possible that each of the virtual machines 102 can implement both a storage node and a compute node. It is also possible that one or more of the virtual machines 102 may implement a storage node but not a compute node.

A given "storage node" as the term is used herein is intended to encompass a data node, a metadata node, or another type of node providing access to at least one of data and metadata for one or more associated compute nodes. The term "compute node" is also intended to be broadly construed, and generally encompasses a system node that runs at least a portion of at least one application.

The software-defined storage pool provided by the fast tier 110 is implemented under the control of a software-defined storage controller 112. More particularly, the software-defined storage controller 112 is configured to implement the software-defined storage pool utilizing the local disk resources of the respective ones of the virtual machines 102.

It should be noted in this regard that the term "local disk resources" as used herein is also intended to be broadly construed, so as to encompass any storage resources that are advertised as comprising at least a portion of a disk resource of a virtual machine. Thus, such local disk resources may comprise respective virtual disk resources that are actually implemented at least in part using electronic memories associated with underlying physical processing devices that support the virtual machines 102. The term "local disk resources" as used herein should therefore not be construed as requiring physical disk-based storage devices.

The above-noted electronic memories utilized to provide at least portions of the memories 106 of the virtual machines 102 may comprise, for example, flash memories, dynamic random access memories (DRAMs), or various combinations of flash, DRAM or other types of electronic memory.

Processing devices of cloud infrastructure used to implement the virtual machines 102 are assumed to be interconnected with one another using high-speed connections. For example, data can be moved between the virtual machines 102 using remote direct memory access (RDMA) connections over InfiniBand or Gigabit Ethernet. Numerous other types of connections and associated data transfer protocols can be used in other embodiments.

The software-defined storage controller 112 is assumed to be part of a storage system that in the FIG. 1 embodiment further comprises data mover modules 114 and a capacity tier 116. Such a storage system or individual portions thereof are further assumed to be configured for communication with the virtual machines 102 over at least one network although such networks are not explicitly shown in the figure. The capacity tier 116 is an example of what is more generally referred to herein as a "back-end storage tier" of the multi-tier storage system. Other types of back-end storage tiers can be used in other embodiments.

The software-defined storage controller 112 in some embodiments is implemented using software-defined storage products such as ScaleIO™ or ViPR® both of which are commercially available from EMC Corporation of Hopkinton, Mass.

For example, implementations utilizing ScaleIO™ for the software-defined storage controller can advantageously support hundreds or thousands of compute nodes, potentially providing a single memory pool with a capacity on the order of a petabyte (PB). Such an arrangement overcomes scalability limitations inherent in certain conventional systems. Also, failure protection functionality provided by ScaleIO™ can be used to protect the fast tier 110 from failures in one or more of the virtual machines 102.

Additional details regarding ScaleIO™ functionality that can be incorporated into a software-defined storage controller in illustrative embodiments can be found in, for example, EMC ScaleIO™ User Guide, V1.32, Document No. 302-001-033, Rev. 11, May 2015, which is incorporated by reference herein.

The data mover modules 114 are illustratively configured to move data between the fast tier 110 and the capacity tier 116. The capacity tier 116 illustratively comprises an object store 117 storing a plurality of objects 118. In other embodiments, the capacity tier 116 could comprise multiple object stores, or other types of storage. Each of the objects 118 stored in the object store 117 is assumed to have a unique object identifier (OID).

A specified set of objects stored in the object store 117 may be made accessible to an application running on a given one of the virtual machines 102 via a corresponding dynamically loadable namespace (DLN) identifier. The DLN identifier is associated with a DLN object stored in the object store 117, with the DLN object comprising identifiers of respective ones of the objects in the specified set.

In some embodiments, a translator at least partially incorporated in or otherwise associated with the multi-tier storage system implements a plurality of translation services and one or more index tables. A given one of the translation services is configured to access at least one of the one or more index tables in order to determine a DLN identifier associated with an application running on a compute node, and to instantiate a name node corresponding to the DLN identifier. Particular objects of the object store 117 of the capacity tier 116 are made accessible to the application via the name node. The translator via the translation services and the at least one index table permits applications running on respective compute nodes having no knowledge of the object storage structure of the object store 117 to access a specified set of objects corresponding to the DLN identifier.

Such arrangements allow for translation-based controlled partitioning of an object store such that an individual application can access only a limited number of the objects associated with a corresponding dynamically loadable namespace. However, the total number of objects that can be controlled across multiple applications using respective dynamically loadable namespaces is essentially unlimited. Accordingly, some embodiments are scalable to essentially unlimited numbers of objects that may be stored in one or more object stores of at least one back-end storage tier. Also, the use of one or more index tables each of which can illustratively be configured as a superblock index table object allows all of the objects of the object store to be addressed as a unified namespace.

Additional details regarding accessing objects of an object store utilizing DLNs can be found in U.S. patent application Ser. No. 14/871,160, filed Sep. 30, 2015 and entitled "Translation-Based Name Node Configuration for Object Access in a Multi-Tier Storage System," which is commonly assigned herewith and incorporated by reference herein.

It should be noted that software-defined storage may also be used for the object store 117 or other portions of the capacity tier 116. For example, in such an arrangement, first and second different sets of software-defined storage parameters can be used in respective ones of the fast and capacity tiers.

The fast tier 110, software-defined storage controller 112, data mover modules 114 and capacity tier 116 are all assumed to be part of the multi-tier storage system of information processing system 100, although other arrangements are possible in other embodiments. Also, it should be noted that components such as software-defined storage controller 112 and data mover modules 114 that are shown as separate from the fast tier 110 and capacity tier 116 in the FIG. 1 embodiment can be implemented at least in part within at least one of the tiers. For example, as will be described elsewhere herein, the software-defined storage controller 112 can be implemented in a distributed manner using the virtual machines 102. The data mover modules 114 can similarly be implemented in a distributed manner using the same virtual machines 102 that are used to implement portions of the fast tier 110.

It is assumed that the fast tier 110 has a relatively high input-output processing speed and a relatively low capacity and the capacity tier 116 has a relatively low input-output processing speed and a relatively high capacity, although other types of multi-tier storage systems can be used in other embodiments.

The data mover modules 114 are illustratively coupled to the storage tiers 110 and 116 and configured to control transfer of data between the storage tiers. The term "data movement" as used in this and other contexts herein is intended to be broadly construed, so as to encompass data migration as well as other types of movement of data between storage tiers of a multi-tier storage system. A given data mover module can be implemented at least in part on storage arrays or other storage platforms that implement at least portions of one or more of the storage tiers of the multi-tier storage system.

Each of at least a subset of the storage tiers of a multi-tier storage system comprises a plurality of storage drives with different types of storage drives being used in different ones of the storage tiers. For example, a fast tier may comprise flash drives while a capacity tier comprises disk drives. The particular storage drives used in a given storage tier may be varied in other embodiments, and multiple distinct storage drive types may be used within a single storage tier. The term "storage drive" as used herein is intended to be broadly construed, so as to encompass, for example, disk drives, flash drives, solid state drives, hybrid drives or other types of storage products and devices.

The storage drives utilized in the fast tier 110 are generally significantly faster in terms of read and write access times than the drives utilized in a capacity tier. Accordingly, the fast tier 110 in some embodiments is a relatively small storage tier optimized for IO processing speed, while the capacity tier 116 is a relatively large but slower storage tier optimized for storage capacity. Terms such as "fast" and "slow" in this context are relative terms and not intended to denote any particular absolute performance level. However, numerous alternative tiering arrangements may be used, including arrangements with three or more tiers each providing a different level of performance. Also, the various tiers of a given multi-tier storage system in other embodiments need not be arranged as respective front-end and back-end storage tiers. Accordingly, numerous alternative storage tiering arrangements can be used in other embodiments. Such alternative arrangements can include, for example, one or more intermediate storage tiers arranged between the front-end and back-end storage tiers of a multi-tier storage system.

The term "multi-tier storage system" as used herein is therefore intended to be broadly construed so as to encompass any of a wide variety of different arrangements of storage tiers. The term "storage tier" as used herein is also intended to be broadly construed, and may comprise, for example, a single storage array or a single-tier storage system.

In some embodiments, the fast tier 110 and the capacity tier 116 of the multi-tier storage system are implemented in the form of a 2 TIERS™ storage system from EMC Corporation of Hopkinton, Mass.

By way of example, a given 2 TIERS™ storage system may comprise fast tier 110 implemented using DSSD™ server-based flash storage devices, also from EMC Corporation, and capacity tier 116 comprising object store 117. In such an arrangement, an IO dispatcher software layer of the 2 TIERS™ storage system may be configured, for example, to pre-fetch data from the object store 117 of the capacity tier 116 into the DSSD™ storage devices of the fast tier 110, as well as to support other types of data movement.

A wide variety of other types of server-based flash storage devices and multi-tier storage systems can be used in other embodiments, as will be apparent to those skilled in the art. References herein to DSSD™ storage devices and the 2 TIERS™ storage system are by way of example only.

The data mover modules 114 may be configured to control movement of data between portions 108 of fast tier 110 and the capacity tier 116 in order to facilitate achievement of desired levels of performance by system users.

The "users" in this embodiment may refer, for example, to respective ones of the virtual machines 102, although the term "user" as utilized herein is intended to be broadly construed so as to encompass numerous other arrangements of human, hardware, software or firmware entities, as well as combinations of such entities.

The data mover modules 114 can communicate with the virtual machines 102, software-defined storage controller 112 and capacity tier 116 via one or more networks or other types of communication media. In distributed implementations, different modules or other portions of a given distributed system component such as software-defined storage controller 112 or data mover modules 114 can be implemented in respective ones of the virtual machines 102 or associated storage or compute nodes.

Although shown as a separate component in this embodiment, the software-defined storage controller 112 in other embodiments can be implemented at least in part within the fast tier 110, the capacity tier 116 or within another system component.

As indicated previously, it is possible to implement the software-defined storage controller 112 in a distributed manner, with portions of the software-defined storage controller 112 possibly being implemented on respective ones of the virtual machines 102 or associated processing platforms. Other types of distributed implementations of the software-defined storage controller 112 are possible. The data mover modules 114 can similarly be implemented in a distributed manner.

It is to be appreciated that these and other features of illustrative embodiments are presented by way of example only, and should not be construed as limiting in any way. Accordingly, different numbers, types and arrangements of virtual machines, front-end storage tiers, software-defined storage controllers, data mover modules and back-end storage tiers can be used in other embodiments.

The fast tier 110, software-defined storage controller 112, data mover modules 114, capacity tier 116 and possibly other elements of the system 100 can be implemented using one or more storage platforms. For example, a given storage platform can comprise any of a variety of different types of storage including network-attached storage (NAS), storage area networks (SANs), direct-attached storage (DAS) and distributed DAS, as well as combinations of these and other storage types, including software-defined storage.

A given storage platform may comprise storage arrays such as VNX® and Symmetrix VMAX® storage arrays, both commercially available from EMC Corporation. Other types of storage products that can be used in implementing a given storage platform in an illustrative embodiment include the previously-mentioned software-defined storage products such as ScaleIO™ and ViPR®, and server-based flash storage devices such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). The software-defined storage controller 112 and data mover modules 114, as well as other system components, may be implemented at least in part using processing devices of such processing platforms.

For example, in a distributed implementation of the software-defined storage controller 112, the software-defined storage modules of the distributed software-defined storage controller are implemented in respective LXCs running on respective ones of the storage nodes or virtual machines 102.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniB and, Gigabit Ethernet or Fibre Channel. Numerous alternative networking arrangements are possible in a given embodiment, as will be appreciated by those skilled in the art.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 204, and is suitable for use in the system 100 but is more generally applicable to other types of systems comprising multiple storage tiers and an associated software-defined storage controller.

In step 200, virtual machines of cloud infrastructure are provided for implementing at least portions of a multi-tier storage system. In the context of the FIG. 1 embodiment, virtual machines 102 are provided to a particular tenant or other user of cloud infrastructure. Such cloud infrastructure illustratively comprises a cloud-based system such as an Amazon Web Services (AWS) system. Other examples of cloud-based systems that can be used to provide virtual machines 102 and possibly other portions of system 100 include Google Cloud Platform (GCP) and Microsoft Azure.

In step 202, a front-end storage tier of the multi-tier storage system is configured to include a plurality of storage nodes of a cluster file system with the storage nodes being implemented on respective ones of the virtual machines. The front-end storage tier further comprises a software-defined storage pool accessible to the storage nodes and comprising local disk resources of respective ones of the virtual machines.

For example, with reference to FIG. 1, the software-defined storage controller 112 of information processing system 100 implements fast tier 110 comprising portions 108 of respective memories 106 of the virtual machines 102. The portions 108 illustratively comprise respective portions of the software-defined storage pool implemented utilizing the software-defined storage controller 112. The virtual machines 102 include respective ones of the storage nodes that have access to the software-defined storage pool.

As mentioned above, the software-defined storage controller in some embodiments comprises a ScaleIO™ software-defined storage controller or a ViPR® software-defined storage controller. The software-defined storage controller is illustratively implemented in a distributed manner over the respective ones of the virtual machines. Other types of software-defined storage controllers can be used in other embodiments, and such software-defined storage controllers can be part of or otherwise associated with a given storage system comprising at least one storage platform.

In step 204, a back-end storage tier of the multi-tier storage system is configured to include at least one object store. For example, in the FIG. 1 embodiment, the back-end storage tier comprises capacity tier 116 having object store 117 storing multiple objects 118. The object store 117 stores objects in association with respective unique OIDs. The object store 117 is illustratively part of the same cloud infrastructure that provides the virtual machines 102 used to implement the fast tier 110. Examples of cloud-based object stores that can be utilized for object store 117 in some embodiments include Amazon Simple Storage Service (S3), GCP Cloud Storage, and Microsoft Azure Blob Storage.

In some embodiments, the front-end storage tier is configured to recover from a failure in the local disk resources of a given one of the virtual machines by obtaining corresponding data from the local disk resources of one or more other ones of the virtual machines via the software-defined storage pool.

With reference to the FIG. 1 embodiment, the fast tier 110 may be configured to recover from a failure in the memory of one of the virtual machines 102 by obtaining corresponding data from the memory of another one of the virtual machines 102. Such failure recovery is assumed to be directed at least in part by the software-defined storage controller 112. A wide variety of other types of configuration or control of the fast tier 110 can be provided by the software-defined storage controller 112.

Figure 2:
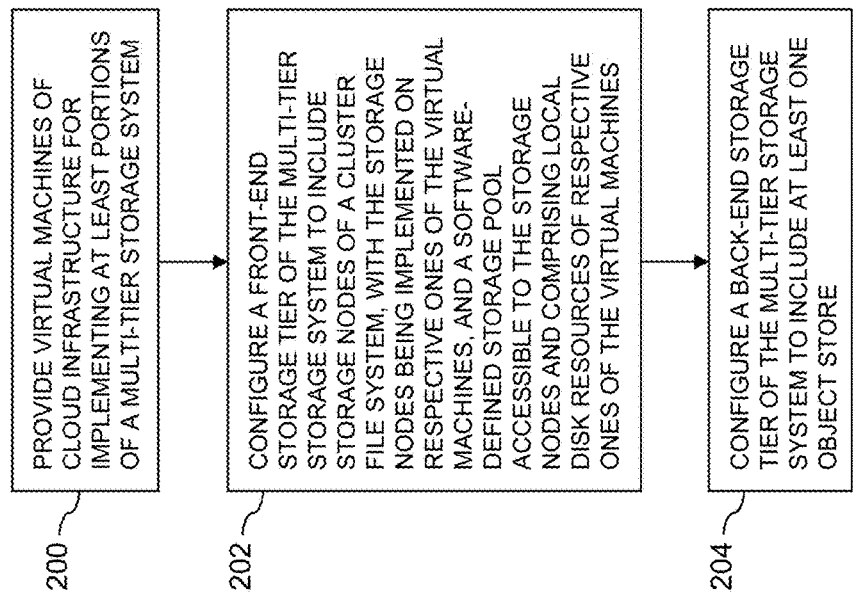
FIG. 2 is a flow diagram of a process for implementing a multi-tier storage system utilizing virtual machines of cloud infrastructure in an illustrative embodiment.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a front-end storage tier implemented at least in part utilizing a software-defined storage controller. For example, the ordering of the process steps may be varied in other embodiments, or certain steps may be performed concurrently with one another rather than serially. Also, one or more of the process steps may be repeated periodically, or multiple instances of the process can be performed in parallel with one another in order to implement a plurality of different front-end storage tiers within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of information processing systems comprising compute nodes and a multi-tier storage system will now be described with reference to FIGS. 3 and 4. In these embodiments, a fast tier of a multi-tier storage system is configured to include a software-defined storage pool comprising respective local disk resources of respective virtual machines. The fast tier is further configured to include storage nodes implemented on respective ones of the virtual machines and configured to access the software-defined storage pool. It is assumed that the software-defined storage controller comprises a ScaleIO™ software-defined storage controller, although other types of controllers, such as a ViPR® software-defined storage controller, could be used. The capacity tier of the multi-tier storage system is omitted from these figures for clarity and simplicity of illustration.

Figure 3:
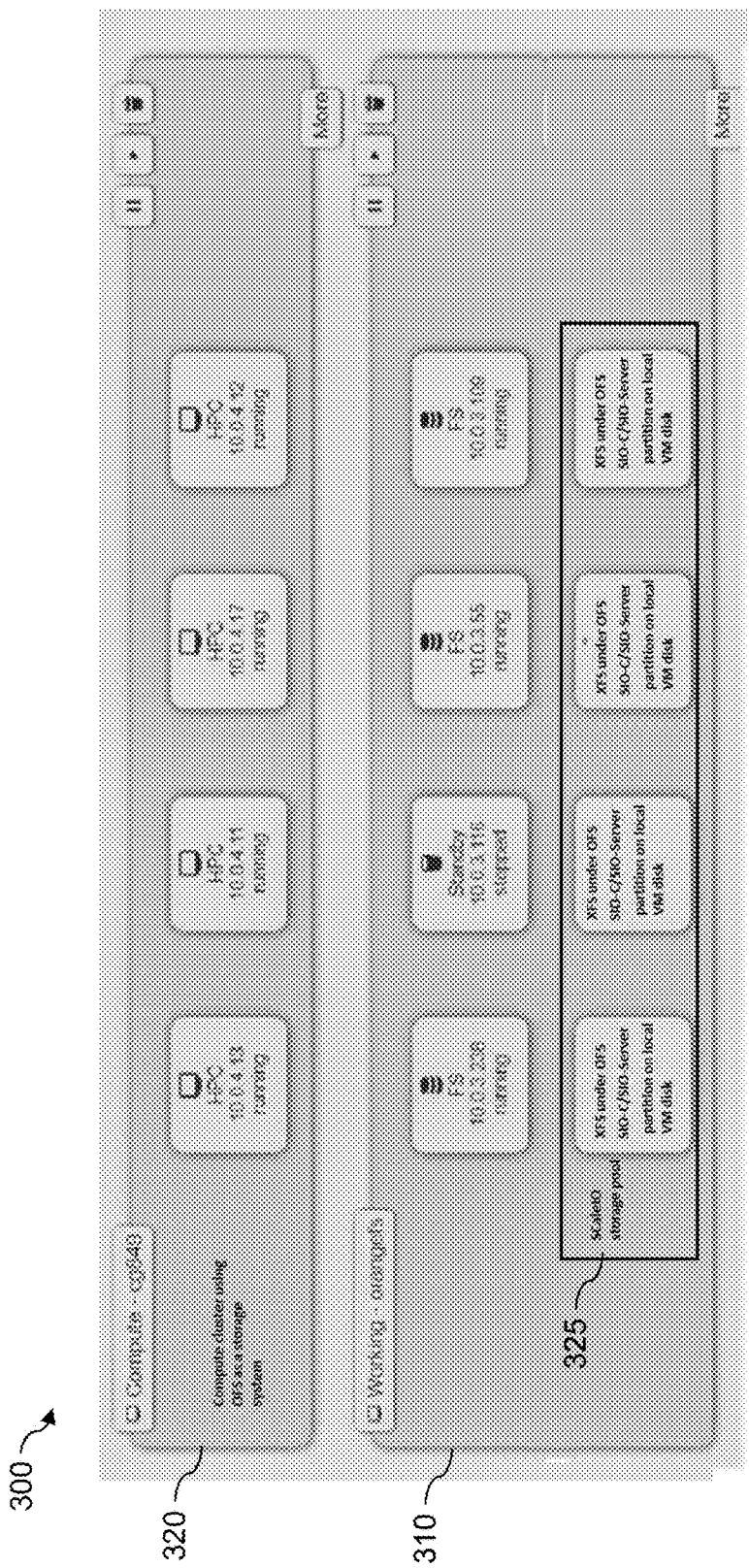
FIGS. 3 and 4 show web interface views of portions of information processing systems in other illustrative embodiments.
Figure 4:
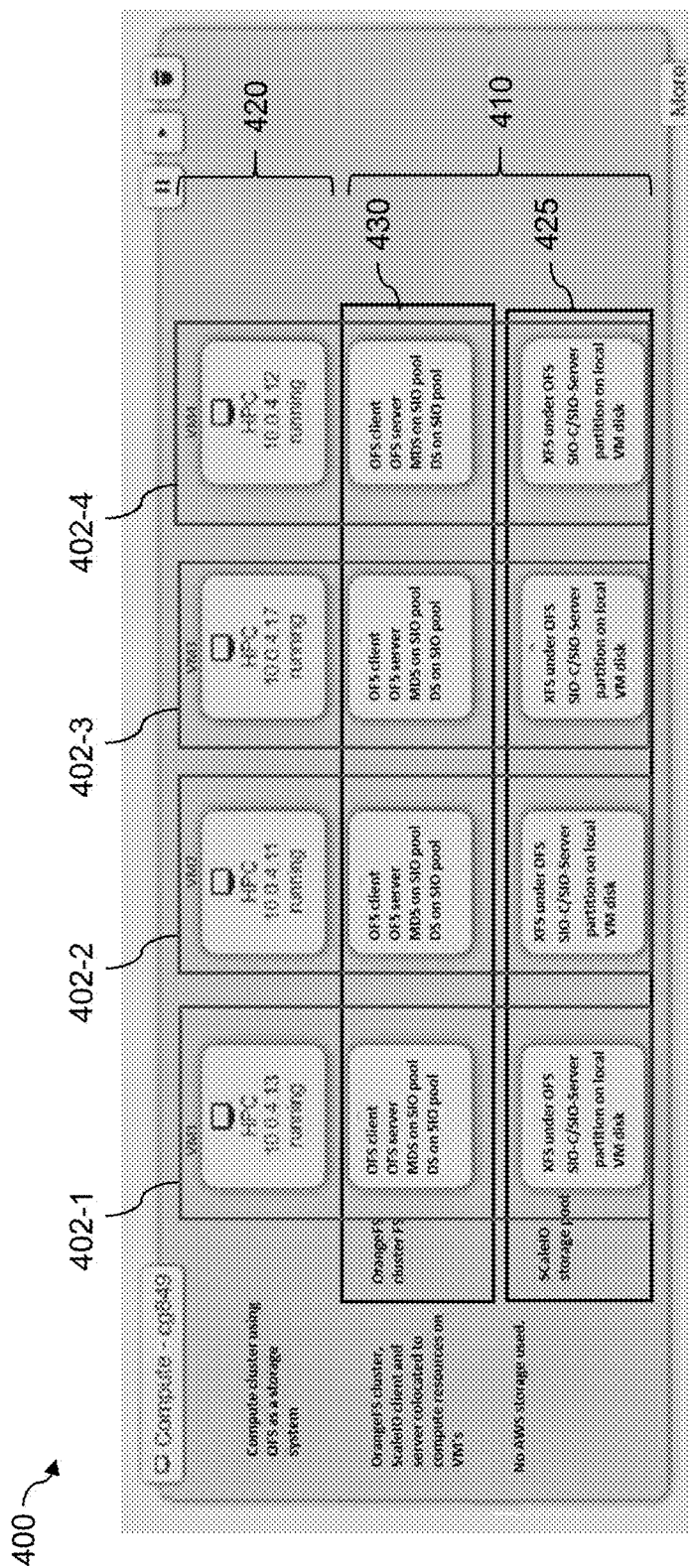

The views shown in FIGS. 3 and 4 are web interface views that are illustratively presented to a tenant or other user of cloud infrastructure that accesses the cloud infrastructure via a user device over a network such as the Internet. These web interface views show components of storage systems that are configured by or on behalf of the tenants or other users through interaction with a corresponding cloud-based system such as an AWS system. Such interaction can include user selection of various parameters and other characteristics of the storage systems, including numbers of virtual machines, storage nodes, compute nodes and amounts of compute, storage and network resources such as CPU resources and local disk resources.

Referring now to FIG. 3, an information processing system 300 comprises a fast tier 310 that includes multiple file system (FS) storage nodes, three of which are indicated as "running" and one of which is indicated as being "stopped" and in a standby mode of operation. The storage nodes are accessible to respective ones of a plurality of compute nodes 320. The compute nodes 320 collectively comprise a compute cluster of a high-performance computer (HPC) system, and are therefore also referred to as respective HPC nodes. Each HPC node is indicated as "running" in this illustration.

The file system in the storage system utilized by the compute nodes 320 illustratively comprises OFS ("OrangeFS"), although it is to be appreciated that other file systems, or combinations of multiple file systems of potentially different types, can be used in other embodiments. OFS is a type of parallel file system, which is an example of what is more generally referred to herein as a "cluster file system."

The fast tier 310 in the FIG. 3 embodiment further comprises a software-defined storage pool 325 that as indicated previously is assumed to be implemented using ScaleIO™ software-defined storage. The software-defined storage pool 325 more particularly utilizes an XFS file system under the above-noted OFS file system, with a ScaleIO™ client ("SIO-C") and ScaleIO™ server ("SIO-Server"), based on local disk resources of respective virtual machines. The local disk resources in this embodiment are also referred to as comprising respective partitions of local VM disks as indicated. In this embodiment, ScaleIO™ software-defined storage modules are used to cluster respective portions of the local VM disks. OFS in this embodiment serves as a flexible parallel file system built on top of the local XFS file systems of the respective local VM disks. OFS utilizes the local XFS file systems of the respective local VM disks to store its trove objects. Again, it should be understood that alternative file systems can be used in place of OFS and XFS in other embodiments.

The fast tier 310 comprising the software-defined storage pool 325 in the FIG. 3 embodiment is implemented as block storage utilizing OFS components of the storage nodes and the underlying local XFS file systems. It is assumed that the capacity tier is implemented using object storage as previously described.

Although the compute nodes 320 are illustratively shown as being separate from the fast tier 310 in the FIG. 3 embodiment, other embodiments can combine the compute nodes and the components of the fast tier on a common set of virtual machines. An example of an embodiment of this type will now be described with reference to FIG. 4.

The embodiment of FIG. 4 illustrates the association between storage nodes, portions of the software-defined storage pool and multiple virtual machines. The information processing system 400 in this embodiment comprises four virtual machines 402-1, 402-2, 402-3 and 402-4 as illustrated, also denoted as VM1, VM2, VM3 and VM4, respectively. The virtual machines 402 are utilized to implement a fast tier 410 of a multi-tier storage system. The system 400 further comprises a compute cluster 420 including HPC nodes that are implemented on respective ones of the virtual machines 402.

The fast tier 410 of the system 400 comprises a software-defined storage pool 425 implemented utilizing local disk resources of respective ones of the virtual machines 402, and more particularly comprising local VM disk partitions as in the embodiment of FIG. 3. The virtual machines 402 also implement respective storage nodes of a cluster file system 430. The cluster file system 430 in this embodiment more particularly comprises an OFS cluster. Each of the storage nodes of the OFS cluster comprises an OFS client and an OFS server. The OFS cluster and ScaleIO™ client and server modules are collocated to compute resources on the corresponding virtual machines 402. The storage nodes of the cluster file system 430 further comprise a metadata server (MDS) and data server (DS). These are OFS components but are illustratively stored on the ScaleIO™ ("SIO") software-defined storage pool 425.

In the FIG. 4 embodiment, portions of local VM disks of respective ones of the virtual machines 402 are clustered to form the SIO software-defined storage pool 425 of the fast tier 410. The SIO components utilized to implement the software-defined storage pool 425 can be pre-installed on sets of virtual machines of cloud infrastructure provided by a given cloud-based system such as an AWS system, GCP system or Microsoft Azure system. Subsets of the virtual machines can then be configured as needed to use their local disk resources as portions of the software-defined storage pool accessible to storage nodes of a cluster file system implemented on those virtual machines. Such an arrangement eliminates the need to utilize costly dedicated block storage devices of the cloud-based system. Moreover, the cluster exhibits high availability through data mirroring functionality of the software-defined storage pool. As a result, particularly efficient and flexible storage is provided for the fast tier 410. For example, a given tenant or other user of an AWS system or other type of cloud-based system having a fast tier configured as disclosed herein can increase its storage capacity by simply selecting larger virtual machines having more compute and storage resources.

The local disk resources utilized to form the software-controlled storage pool in some embodiments comprise solid state drives (SSDs) or other types of electronic memory such as flash or DRAM. Associated physical infrastructure can utilize interconnection protocols such as PCIe in order to support higher access speeds.

The FIG. 4 embodiment comprises four virtual machines 402 each of which includes a compute node of compute cluster 420, a storage node of cluster file system 430, and a portion of the software-defined storage pool 425. Such an arrangement is also referred to herein as a "hyperconverged" arrangement. However, numerous other arrangements are possible. For example, in other embodiments, the compute nodes may be separate from the virtual machines, as in an arrangement in which the compute nodes are implemented on separate processing devices of one or more other processing platforms.

As a more particular example of possible alternative arrangements, instead of all 12 virtual machines in a 12-node cluster arrangement each comprising both an SIO client and an SIO server, 8 of the 12 virtual machines may each comprise an SIO client, and the remaining 4 may each comprise an SIO server. Alternatively, 8 of the virtual machines could be used as compute nodes and 4 of the virtual machines could be configured to provide a software-defined software pool for use by the compute nodes.

One or more of the components associated with a given storage node can each be implemented using an LXC running on the corresponding virtual machine 402. For example, the OFS client and server components and MDS and DS components can each be implemented in a different LXC, or multiple such components can be combined into a single LXC. Distributed software-defined storage controller modules can similarly be implemented using LXCs running on the virtual machines 402.

Assuming that the virtual machines 402 are provided by cloud infrastructure such as an AWS system, the FIG. 4 embodiment avoids the need for any AWS storage such as AWS dedicated block storage devices that might otherwise be needed in the absence of the software-defined storage pool 425. This can significantly reduce the cost to a tenant or other user of storage deployed in a public cloud.

For example, an eight-node implementation of the FIG. 4 embodiment, utilizing a ScaleIO™ software-defined storage pool and associated storage nodes to support compute node execution of the well-known BLAST genetics application, resulted in total storage costs approximately one-fourth those that would have been incurred using AWS dedicated block storage devices. Similar cost reductions are believed to be achievable for other cluster configurations and compute node applications.

Although the embodiments of FIGS. 3 and 4 illustratively utilize OFS in implementing the storage nodes of the fast tiers 310 and 410, the disclosed techniques can be extended in a straightforward manner to any of a number of alternative file systems available via AWS or other cloud-based systems.

In the event of a failure in a given one of the virtual machines 402 that provides a corresponding portion of the software-defined storage pool 425, data mirrored by ScaleIO™ to one or more other ones of the virtual machines 402 can be obtained quickly and easily in order to recover from the failure. The recovery can include all the components of the virtual machine that are part of the software-defined storage pool.

For example, illustrative embodiments can be configured such that the software-defined storage pool mirrors the entire virtual disk of a given virtual machine. In an arrangement of this type, access to the entire virtual disk of the given virtual machine can be provided to a standby or backup virtual machine responsive to a failure in the given virtual machine. This is in contrast to conventional arrangements in which the content of the virtual disk could be lost upon failure of the corresponding virtual machine.

It should be understood that the particular node and component configurations illustrated in FIGS. 3 and 4 are presented by way of illustrative example only, and should not be construed as limiting in any way. Numerous alternative configurations of compute nodes, front-end storage tiers, storage nodes, software-defined storage pools and other system elements can be used in other embodiments.

Illustrative embodiments disclosed herein can provide a number of significant advantages relative to conventional arrangements.

For example, one or more embodiments provide enhanced efficiency and flexibility in implementation of a fast tier or other front-end storage tier in cloud infrastructure of a cloud-based system such as an AWS system. The front-end storage tier implemented using storage nodes and a software-defined storage pool accessible to those storage nodes significantly reduces storage costs relative to conventional arrangements, while also improving availability by facilitating recovery from failures. In addition, scalability to hundreds or thousands of nodes can be easily supported. These embodiments can therefore remove obstacles to more widespread adoption of public clouds.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines 102, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of virtual machines 102, fast tier 110, software-defined storage controller 112 and data mover modules 114 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, compute nodes, storage tiers, software-defined storage controllers, data mover modules and associated storage devices. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a multi-tier storage system comprising at least a front-end storage tier and a back-end storage tier;
   the multi-tier storage system being implemented at least in part utilizing a plurality of virtual machines of cloud infrastructure;
   the front-end storage tier comprising:
      a plurality of storage nodes of a cluster file system with the storage nodes being implemented on respective ones of the virtual machines; and
      a software-defined storage pool accessible to the storage nodes and implemented utilizing local disk resources of respective ones of the virtual machines;
   the back-end storage tier being separate from the software-defined storage pool and comprising at least one object store;
   wherein the multi-tier storage system is configured to recover from a failure in the local disk resources of a given one of the virtual machines by obtaining corresponding data from the local disk resources of one or more other ones of the virtual machines via the software-defined storage pool;
   wherein a capacity of the software-defined storage pool is automatically adjustable by adjusting sizes of at least a subset of the virtual machines; and
   wherein the cloud infrastructure is implemented by a processing platform comprising a plurality of processing devices.

2. The apparatus of claim 1 wherein at least a subset of the virtual machines further comprise respective compute nodes that are configured to access the multi-tier storage system.

3. The apparatus of claim 2 wherein at least one of the virtual machines implements a storage node but not a compute node.

4. The apparatus of claim 2 wherein the object store is configured to store data in the form of objects having respective object identifiers and wherein a specified set of the objects is made accessible to an application running on a given one of the compute nodes via a corresponding dynamically loadable namespace identifier.

5. The apparatus of claim 1 wherein at least one of the storage nodes comprises a file system client and a file system server.

6. The apparatus of claim 1 wherein at least one of the storage nodes implements at least one of a metadata server and a data server with a given such server being stored in the software-defined storage pool.

7. The apparatus of claim 1 wherein the cluster file system comprises at least one of a parallel file system and a distributed file system.

8. The apparatus of claim 1 further comprising a software-defined storage controller configured to implement the software-defined storage pool utilizing the local disk resources of the respective ones of the virtual machines.

9. The apparatus of claim 8 wherein the software-defined storage controller is implemented in a distributed manner over the respective ones of the virtual machines.

10. The apparatus of claim 8 wherein the software-defined storage controller is configured to mirror an entire virtual disk of a given one of the virtual machines such that access to the entire virtual disk of the given virtual machine can be provided to another virtual machine responsive to a failure in the given virtual machine.

11. The apparatus of claim 1 wherein the storage nodes are implemented on respective ones of the virtual machines at least in part utilizing at least one of flash memories and dynamic random access memories of those virtual machines.

12. An information processing system comprising the apparatus of claim 1.

13. A method comprising:
   providing a plurality of virtual machines of cloud infrastructure for implementing at least portions of a multi-tier storage system;
   configuring a front-end storage tier of the multi-tier storage system to include:
      a plurality of storage nodes of a cluster file system with the storage nodes being implemented on respective ones of the virtual machines; and
      a software-defined storage pool accessible to the storage nodes and comprising local disk resources of respective ones of the virtual machines;
   configuring a back-end storage tier of the multi-tier storage system to include at least one object store, the back-end storage tier being separate from the software-defined storage pool; and
   recovering from a failure in the local disk resources of a given one of the virtual machines by obtaining corresponding data from the local disk resources of one or more other ones of the virtual machines via the software-defined storage pool;
   wherein a capacity of the software-defined storage pool is automatically adjustable by adjusting sizes of at least a subset of the virtual machines; and
   wherein the method is performed by a processing platform comprising a plurality of processing devices.

14. The method of claim 13 wherein at least a subset of the virtual machines further comprise respective compute nodes that access the multi-tier storage system.

15. The method of claim 13 wherein configuring the front-end storage tier to include a software-defined storage pool further comprises controlling the software-defined storage pool utilizing a software-defined storage controller implemented in a distributed manner over the respective ones of the virtual machines.

16. A non-transitory processor-readable storage medium having stored therein program code of one or more software programs, wherein the program code when executed by a processing platform comprising a plurality of processing devices causes said processing platform:

to provide a plurality of virtual machines of cloud infrastructure for implementing at least portions of a multi-tier storage system;

to configure a front-end storage tier of the multi-tier storage system to include:
- a plurality of storage nodes of a cluster file system with the storage nodes being implemented on respective ones of the virtual machines; and
- a software-defined storage pool accessible to the storage nodes and comprising local disk resources of respective ones of the virtual machines;

to configure a back-end storage tier of the multi-tier storage system to include at least one object store, the back-end storage tier being separate from the software-defined storage pool;

wherein the multi-tier storage system is further configured to recover from a failure in the local disk resources of a given one of the virtual machines by obtaining corresponding data from the local disk resources of one or more other ones of the virtual machines via the software-defined storage pool; and wherein a capacity of the software-defined storage pool is automatically adjustable by adjusting sizes of at least a subset of the virtual machines.

17. The processor-readable storage medium of claim 16 wherein configuring the front-end storage tier to include a software-defined storage pool further comprises controlling the software-defined storage pool using a software-defined storage controller implemented in a distributed manner over the respective ones of the virtual machines.

\* \* \* \* \*